Dec. 7, 1954      L. BAUMSTARK      2,696,349
EGG COUNTING MECHANISM

Filed July 24, 1953

LEOPOLD BAUMSTARK,
INVENTOR.

BY

ATTORNEY.

United States Patent Office 2,696,349
Patented Dec. 7, 1954

2,696,349

EGG COUNTING MECHANISM

Leopold Baumstark, Los Angeles, Calif.

Application July 24, 1953, Serial No. 370,116

4 Claims. (Cl. 235—98)

This invention relates to egg counting mechanism, and more particularly to an egg counting mechanism, in connection with an individual hen cage, and so arranged that each egg as it is laid, will roll past a counter actuating mechanism and into a holder for eggs to be gathered.

Among the salient objects of the invention are:

To provide a simple, economical and accurate egg counting mechanism, to be attached to or made as a part of a hen cage, preferably an individual hen cage, for automatically counting and registering each egg as it is laid, and rolls down the roll-way past the actuating part of the counter;

To provide in connection with a scale, a movable indicator for indicating on said scale, the number of eggs which have been laid during any particular period, said indicator being actuated by the egg rolling through or past the actuator to the place of deposit;

To provide a simple actuating mechanism, to be actuated by the rolling eggs, and which in turn moves the indicator along the scale where it remains until moved by the next egg.

Other objects and advantages of the invention will appear from the following detailed description of one practical embodiment of the invention, taken with the accompanying sheet of drawings, which I will now describe. In the drawings.

Referring now in detail to the drawings, the invention as here illustrated, is shown in connection with a hen cage 6, only a portion of which is shown. The feed trough is designated 7.

The cage, as here shown, has spaced wire bottom or floor wires 6′, 6′, sufficiently inclined toward the front to form a roll-way for the eggs, as they are laid, to roll down to the front into the place from which they can be gathered.

Figure 5:
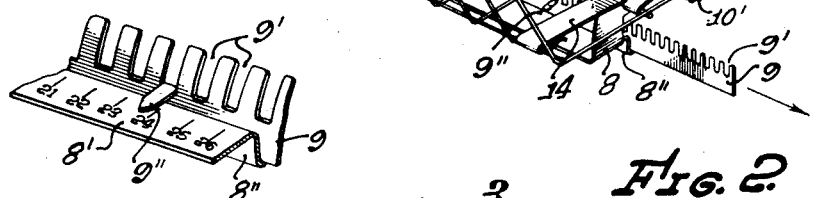
Figure 5 is a fragmentary view of the scale member, with the indicator, or counter, to be moved along said scale for indicating the number of eggs laid in a given time.

Secured to the outer floor wires 6′, at opposite sides of the cage, are two bearing plates or members, as 8, 8, formed as the ends of a scale member 8′, on which the numerals appear for indicating the count of eggs. The rear edge of said scale member 8′, has formed therein a channel, or slide-way 8″, for a counter or indicator 9, having actuating spaces, as 9′, formed successively therein, as seen in Fig. 5. A struck-out finger 9″ is positioned to overlie the scale 8′. Said plate portions 8, 8, of the scale member, form bearings for the opposite ends of a shaft, or wire, 10, on which are secured, at spaces apart, and staggered, fingers or vanes, as 11, 11, adapted to be engaged by an egg rolling across said shaft, or wire, whereby to turn it a partial turn.

Figure 1:
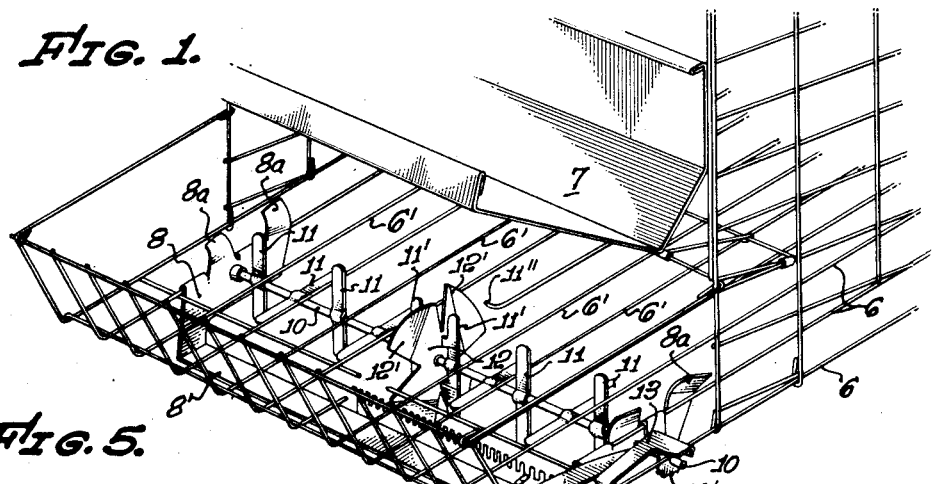
Figure 1 is a fragmentary perspective view of the front of an individual hen cage, showing the egg-operated counter-actuator.

On the middle of said shaft or wire, is mounted an actuator 12, consisting of a disc-like member with segmental vane portions 12′ spaced to move into the spaces 9′ in the indicator, whereby to move said indicator one space at each partial turn of said shaft and said actuator 12. This actuator 12, is mounted between two of the fingers, designated 11′, 11′, and seen in Figs. 1 and 2. The floor wire 6′, just above the actuator 12, at 11″, is bent to turn an egg away from said actuator and so that it will move one of the fingers 11 and thus turn the shaft and the actuator 12 a partial turn, which is sufficient to move the counter or indicator 9, as before described.

Figure 3:
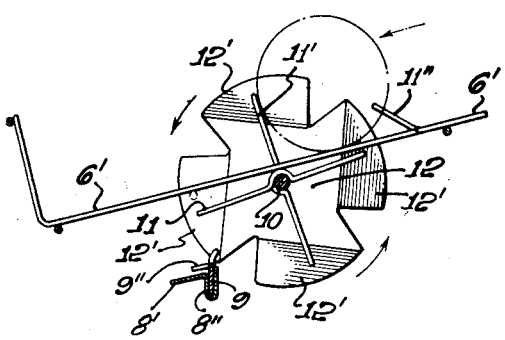
Figure 3 is a sectional detail as seen from line 3—3, Fig. 2.
Figure 4:
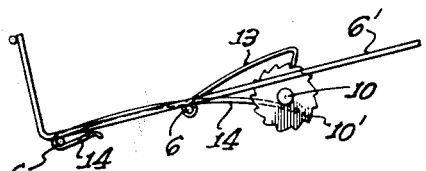
Figure 4 is an end view, as seen from line 4—4, on Fig. 2.
Figure 4:

Referring to Fig. 4, the end of the shaft 10, is provided with a ratchet wheel 10′, with a spring dog 13 hooked thereon to prevent said shaft 10 and the fingers from turning backward, but permitting them to turn forwardly with each egg engagement with one of said fingers. A spring member 14 underlies the shaft 10, and frictionally prevents it from turning loosely and so that the parts make only a partial turn, as intended, with each egg rolling across the shaft or axis of the actuator, as indicated in light broken lines in Fig. 3.

Figure 2:
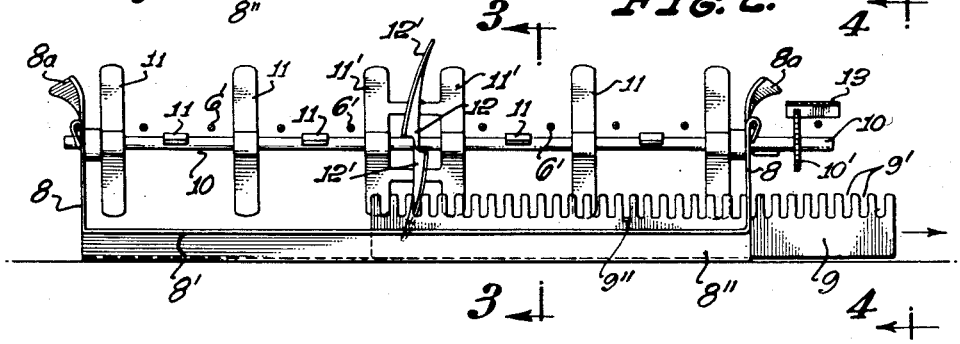
Figure 2 is an enlarged view of the egg-operated, counter-actuator.

The end plate bearing members 8, 8, at the opposite ends of the scale portion 8′, thereof, Fig. 2, are also bent or flared outwardly, as at 8ª, to guide the eggs to a finger 11. These make for more accuracy, each egg moving the indicator finger one notch or count along the scale 8′.

Thus I have provided a very simple, practical, economical and accurate counting and recording the number of eggs laid, and which is actuated by the egg which is counted as it rolls across the shaft 10, and engages one of the fingers 11 for turning said shaft a partial turn. This same shaft 10, has the counter-actuator member 12, with the actuating vanes 12′ bent to move the counter or indicator 9 one notch or count at a time for each egg.

I am aware that changes can be made in the details of construction and arrangement as here shown for purposes of explanation, without departing from the spirit of the invention, and I do not, therefore, limit the invention to the showing made, except as I may be limited by the hereto appended claims, forming a part of this specification.

I claim:

1. In combination with a hen cage having an inclined roll-way for eggs laid thereon to roll by gravity to a pick-up position, a horizontal scale member having counting digits thereon, an indicator movably mounted to be moved along said scale member, digit by digit, an actuator for intermittently moving said indicator along said scale member from one digit to the next adjacent digit, and means in the path of a rolling egg on said roll-way to be engaged and moved by said egg for moving said actuator, whereby each egg rolling against said actuator moves said indicator along said scale member.

2. An egg counting mechanism as set forth in claim 1 in which the actuator is a disc-like member with segmental vane portions to engage and move said indicator intermittently along said scale member.

3. An egg counting mechanism as set forth in claim 1 in which the means in the path of a rolling egg is a series of upwardly projecting fingers on a shaft to be engaged by an egg and depressed to turn said shaft a partial turn, and in which said actuator is a disc-like member on said shaft to be intermittently turned with said shaft for intermittently moving said indicator along said scale member.

4. In combination with a hen cage having an inclined roll-way for eggs laid thereon to roll by gravity to a pick-up position, a horizontal scale member having counting digits thereon, an indicator slidable on said scale member and having a finger to point to said counting digits, said indicator having a series of actuating spaces formed therein, an actuator for intermittently moving said indicator digit by digit, said actuator being rotatable and having portions to engage in said actuating spaces for moving said indicator, and means in the path of a rolling egg on said roll-way to be engaged and moved by said egg for moving said actuator.

References Cited in the file of this patent

UNITED STATES PATENTS

| Number | Name | Date |
|---|---|---|
| 163,544 | Thoss et al. | May 18, 1875 |
| 254,005 | Griffith | Feb. 21, 1882 |
| 640,850 | Work | Jan. 9, 1900 |
| 713,205 | Cary | Nov. 11, 1902 |
| 1,123,545 | Johnson | Jan. 5, 1915 |
| 1,968,337 | Doull | July 31, 1934 |
| 2,015,147 | Knight | Sept. 24, 1935 |